(12) United States Patent
Williams et al.

(10) Patent No.: US 11,485,797 B2
(45) Date of Patent: Nov. 1, 2022

(54) PRODUCTION OF CHEMICALLY DERIVATIZED NANOCELLULOSE

(71) Applicant: SAPPI Netherlands Services B.V., Maastricht (NL)

(72) Inventors: Rhodri Williams, Edinburgh (GB); Robert English, Eilean Siar (GB); John Heaton, Maastricht (GB)

(73) Assignee: SAPPI Netherlands Services B.V., Maastricht (NL)

( * ) Notice: Subject to any disclaimer, the term of this patent is extended or adjusted under 35 U.S.C. 154(b) by 267 days.

(21) Appl. No.: 16/303,165

(22) PCT Filed: May 23, 2017

(86) PCT No.: PCT/EP2017/062478
§ 371 (c)(1),
(2) Date: Nov. 20, 2018

(87) PCT Pub. No.: WO2017/202878
PCT Pub. Date: Nov. 30, 2017

(65) Prior Publication Data
US 2020/0317821 A1 Oct. 8, 2020

(30) Foreign Application Priority Data
May 25, 2016 (EP) .................................... 16171449

(51) Int. Cl.
| | |
|---|---|
| *C08B 11/12* | (2006.01) |
| *C08B 11/14* | (2006.01) |
| *C08B 11/15* | (2006.01) |
| *C08B 15/08* | (2006.01) |
| *C08J 3/05* | (2006.01) |
| *C08J 3/12* | (2006.01) |

(52) U.S. Cl.
CPC .............. *C08B 11/12* (2013.01); *C08B 11/14* (2013.01); *C08B 11/15* (2013.01); *C08B 15/08* (2013.01); *C08J 3/05* (2013.01); *C08J 3/12* (2013.01); *C08J 2301/10* (2013.01); *C08J 2301/28* (2013.01)

(58) Field of Classification Search
CPC .. C08B 15/06; C08B 3/04; C08B 3/06; C08B 3/12
See application file for complete search history.

(56) References Cited

U.S. PATENT DOCUMENTS

| | | | | |
|---|---|---|---|---|
| 2,748,109 | A * | 5/1956 | Allewelt ................. | C08B 15/06 536/33 |
| 2014/0073776 | A1 * | 3/2014 | Shiramizu ............... | C08L 69/00 536/69 |

FOREIGN PATENT DOCUMENTS

| | | | |
|---|---|---|---|
| CN | 102317542 A | | 1/2012 |
| CN | 103333259 A | * | 10/2013 |
| CN | 104004104 A | | 8/2014 |
| CN | 104047198 A | | 9/2014 |
| CN | 104470951 A | | 3/2015 |
| CN | 105531419 A | | 4/2016 |
| EP | 2787105 A1 | | 10/2014 |
| JP | 2015-500354 A | | 1/2015 |
| WO | 2008053820 A1 | | 5/2008 |
| WO | 2015/200584 A1 | | 12/2015 |

OTHER PUBLICATIONS

Li et al. ("Homogeneous isolation of nanocelluloses by controlling the shearing force and pressure in microenvironment", Carbohydrate Polymers (2014), 113, 389-393) (Year: 2014).*
Roland Bodmeier et al. ("Hydrolysis of Cellulose Acetate and Cellulose Acetate Butyrate Pseudolatexes Prepared by a Solvent Evaporation—Microfluidization Methed" Drug Development and Industrial Pharmacy, 19(5), 521-530 (1993)) . (Year: 1993).*
Bodmeier et al ("Hydrolysis of Cellulose Acetate and Cellulose Acetate Butyrate Pseudolatexes Prepared by a Solvent Evaporation-Microfluidization Method" Drug Development and Industrial Pharmacy, 19(5), 521-530 (1993)) (Year: 1993).*
Samuel Eyley, et al., "Surface modification of cellulose nanocrystals", Nanoscale, 2014, pp. 7764-7779, vol. 6.
Pegah Khanjani, "Cellulose-based Superhydrophobic Surfaces & Dynamics of Coupled Chemical Systems", Apr. 28, 2015, 60 pages.
International Search Report for PCT/EP2017/062478 dated Jul. 3, 2017 [PCT/ISA/210].
Written Opinion for PCT/EP2017/062478 dated Jul. 3, 2017 [PCT/ISA/237].
Fengcai et al., "Preparation and characterization of acetylated nanocellulose by one-step method", Chemical Industry and Engineering Progress, vol. 35, No. 2, 2016, pp. 559-564.
Office Action dated Jun. 30, 2020 in Chinese Application No. 201780031449.6.
Office Action dated May 13, 2020 in Eurasian Application No. 201892692.
Communication dated Feb. 2, 2021, from the Japanese Patent Office in Application No. 2018-559987.

* cited by examiner

*Primary Examiner* — Leigh C Maier
*Assistant Examiner* — Everett White
(74) *Attorney, Agent, or Firm* — Sughrue Mion, PLLC

(57) ABSTRACT

The present invention provides a method for the production of chemically derivatized nanocellulose, comprising the step of a. contacting a precursor cellulosic material with a chemically derivatizing composition to form a liquid reaction mixture, and b. chemically reacting the formed liquid reaction mixture, and c. subjecting the formed liquid reaction mixture to microfluidisation, wherein the steps b. and c. are carried out simultaneously.

15 Claims, No Drawings

025B2
PRODUCTION OF CHEMICALLY DERIVATIZED NANOCELLULOSE

CROSS REFERENCE TO RELATED APPLICATIONS

This application is a National Stage of International Application No. PCT/EP2017/062478, filed on May 23, 2017, which claims priority from European Patent Application No. 16171449.8, filed on May 25, 2016.

TECHNICAL FIELD

The present invention relates to a method for the production of chemically derivatized nanocellulose.

PRIOR ART

Chemical modification of cellulose, in particular of nanocellulose (CNC or CNF), is an increasingly important topic in the industry of cellulosic products.

So far, many types of cellulose nanocrystal or nanofibril modification reactions have been published in the literature, but only on a laboratory scale and thus far most of the scientific effort has been dedicated to analyzing the products of the cellulose nanocrystal or nanofibril modifications, for instance with respect to the degree of substitution. The main categories of reactions carried out on nanocellulose are oxidations, esterifications, amidations, carbamations and etherifications, and more recently nucleophilic substitutions have been used to introduce specific surface functionality to nanocellulose. The commonly used mechanisms of the modification reactions are for example presented in a review article by Eyley and Thielemans Nanoscale, 2014, 6, 7764-7779. At a lab scale, the chemical modification of the nanocellulose is carried out with commercially available nanocellulose that has previously been isolated in a separate process.

Commercially available nanocellulose can be prepared from any cellulose source material, and commonly wood pulp is used. In order to arrive at nanocellulose, the cellulose fibers of the wood pulp are exposed to high shear forces, which "rip" (delaminate) the larger cellulose fibers apart into nanocellulose. For this purpose, the wood pulp is generally mechanically comminuted in a suitable apparatus such as high-pressure homogenizers, ultrasonic homogenizers, grinders or microfluidizers. The homogenizers are used to delaminate the cell walls of the wood fibers and liberate the nanocellulose. Alternatively, a substantially more crystalline form of nanocellulose can be isolated from cellulose fibers of wood pulp using sulfuric or hydrochloric acid to hydrolyze the amorphous regions of native cellulose fibers in order to yield highly crystalline cellulose nanocrystals (CNC).

However, if chemically modified nanocellulose is to be produced at economically affordable conditions in large amounts, there is a need to provide a less complex method than the above-described lab scale methods, in which only small quantities of chemically modified nanocellulose can be produced.

SUMMARY OF THE INVENTION

The present invention solves the above-mentioned problems by providing a method for the production of chemically derivatized nanocellulose in which the chemically derivatized nanocellulose can be produced in-line (i.e. in a continuous manner) of a traditional production process for cellulosic material.

It is an object of the present invention to provide a method for the production of chemically derivatized nanocellulose, comprising the step of a. contacting a precursor cellulosic material with a chemically derivatizing composition to form a liquid reaction mixture, and b. chemically reacting the formed liquid reaction mixture, and c. subjecting the formed liquid reaction mixture to high shear conditions, and most preferably to microfluidisation, wherein the steps b. and c. are carried out simultaneously.

In the method according to the invention, the precursor cellulosic material, such as for example wood pulp, can be contacted with a given reagent that has the capability of chemically modifying the surface of cellulose at the same time the cellulose precursor material is subjected to high shear forces that break down or delaminate the precursor material into a cellulosic material of a given fineness, and in particular into nanocellulose.

An advantage of uniting the mechanical delamination process with the chemical derivatization is that the production of chemically derivatized nanocellulose and in particular the production of chemically derivatized nanocellulose is greatly simplified. Thus, mechanical delamination and chemical derivatization occur simultaneously in order to yield a chemically derivatized nanocellulose.

It is another object of the present invention to provide chemically derivatized nanocellulose obtained according the method described above.

It is yet another object of the present invention to provide a polymer composition comprising chemically derivatized nanocellulose obtained according the method described above.

Further embodiments of the invention are laid down in the dependent claims.

DESCRIPTION OF PREFERRED EMBODIMENTS

It is an object of the present invention to provide a method for the production of chemically derivatized nanocellulose, comprising the step of a. contacting a precursor cellulosic material with a chemically derivatizing composition to form a liquid reaction mixture, and b. chemically reacting the formed liquid reaction mixture, and c. subjecting the formed liquid reaction mixture to high shear conditions, wherein the steps b. and c. are carried out simultaneously.

A person skilled in the art will know how to manipulate the formed reaction mixture, depending on the type of chemical reaction, such that the chemical reaction of the precursor cellulosic material and the chemically derivatizing composition react in the formed liquid reaction mixture at the time when the formed liquid reaction mixture is subjected to high shear conditions. For some reactions, it will be useful to subject the formed liquid reaction to high shear conditions within a given time, before the chemically derivatizing agent is entirely spent, whereas other reactions will additionally need to be thermally or chemically initiated before subjecting to high shear conditions.

In one embodiment of the present invention, the formed liquid reaction mixture is subjected to microfluidisation, i.e. to high shear conditions in a microfluidic device.

In the context of the present invention, the term "chemically derivatized nanocellulose" refers to nanocellulose in which at least one native anhydroglucose unit has been changed in its chemical composition.

As examples, the chemically derivatized nanocellulose according to the invention may be nanocellulose in which the hydroxyl moieties of the anhydroglucose unit have been oxidized to aldehyde or carboxyl moieties, esterified, amidated, carbamated, etherified, or nucleophilically substituted. It is understood that nanocellulose, in which the C2-C3 bond of the anhydroglucose unit is cleaved via a redox reaction, also constitutes a chemically derivatized nanocellulose.

In one embodiment of the present invention, the precursor cellulosic material is a suspension of precursor cellulosic material in a liquid phase, said liquid phase preferably being an aqueous phase or a non-aqueous phase and comprises, or consists of, an organic solvent such as acetone or toluene, or of mixtures thereof such as for example a mixture of toluene and pyridine. This makes the handling of the precursor cellulosic material easier, since a liquid precursor cellulosic material can be pumped and fed more easily into the microfluidic device in which the precursor cellulosic material is contacted with the chemically derivatizing composition and then subjected to high shear conditions. In a preferred embodiment, the precursor cellulosic material is chemically unmodified pulp, preferably in the form of aqueous slurry, and which pulp has preferably been refined to at least 80° SR or 80° SR to 100° SR, and more preferably to at least 90° SR or 90° SR to 100° SR. The pulp can be sourced from various plant materials, and is in particular sourced from softwood or hardwood material. Alternatively, the pulp can also be sourced from recycled paper or cardboard products.

The chemically derivatizing composition is a composition that comprises at least one chemically derivatizing agent, or a mixture of chemically derivatizing agents. It may further comprise catalytic agents that enable a more efficient chemical derivatization of the cellulosic material through the chemically derivatizing agent. For example, the chemically derivatizing agent may be an acetylating agent such as acetic acid, a transesterification agent such as alkenyl or vinyl carboxylate, a sulfonating agent such as vinyl sulfone, or a monomeric agent for the purpose of allowing the simultaneous or subsequent grafting of polymeric chains such as (meth)acrylic acid.

In a preferred embodiment of the method according to the invention, the chemically derivatizing composition is a liquid chemically derivatizing composition. In this case, the chemically derivatizing agent comprised therein is either dispersed or solubilized in a liquid such as for example a non-aqueous liquid. In a more preferred embodiment, the chemically derivatizing agent is dissolved in said liquid, thus forming a solution of chemically derivatizing agent. The liquid can be chosen from liquids capable of solubilizing the chemically derivatizing composition, and is most preferably chosen from aqueous liquids, in particular water, or from non-aqueous liquids, in particular organic solvents such as acetone, toluene or mixtures thereof. Consequently, a preferred form of the liquid chemically derivatizing composition is an aqueous solution of chemically derivatizing agent or a non-aqueous solution of chemically derivatizing agent such as for example a non-aqueous solution of an acylating agent Any catalytic agent, if comprised in the chemically derivatizing composition, may or may not be solubilized in the aqueous or non-aqueous solution.

In another preferred embodiment, the liquid chemically derivatizing composition provides for essentially the entire liquid comprised in the liquid reaction mixture formed from the combination of precursor cellulosic material and chemically derivatizing composition. This is advantageously the case where the precursor cellulosic material is combined with the chemically derivatizing composition added in dry form such as for example a powder or in slurry that contains little liquid and preferably contains no water that is not chemically bound. In this way, the liquid provided by the liquid chemically derivatizing composition enables adjustment of the consistency of the reaction liquid reaction mixture to a degree that is optimal for processing at high shear conditions, such as for example when the liquid reaction mixture is subjected to microfluidisation. This way the consistency of the reaction liquid reaction mixture can be independently regulated without dilution of the chemically derivatizing agent and the catalyst, if present, keeping not only optimal consistency but also optimal reactant concentrations.

In a much preferred embodiment, the method for the production of chemically derivatized nanocellulose is a method comprising the step of a. contacting a precursor cellulosic material with a chemically derivatizing composition to form a liquid reaction mixture, and b. chemically reacting the formed liquid reaction mixture, and c. subjecting the formed liquid reaction mixture to microfluidisation, wherein the steps b. and c. are carried out simultaneously and wherein the chemically derivatizing composition comprises an acylating agent and the precursor cellulosic material is a suspension of preferably chemically unmodified nanocellulose in a liquid phase, said liquid phase being a non-aqueous phase comprising, or consisting of, an organic solvent such as for example acetone or toluene or mixtures thereof, and preferably where the acylating agent is chosen from carboxylic acids or anhydrides thereof.

In another much preferred embodiment, the method for the production of chemically derivatized nanocellulose is a method comprising the step of a. contacting a precursor cellulosic material which is preferably a chemically unmodified nanocellulose with a chemically derivatizing composition to form a liquid reaction mixture, and b. chemically reacting the formed liquid reaction mixture, and c. subjecting the formed liquid reaction mixture to microfluidisation, wherein the steps b. and c. are carried out simultaneously and wherein the chemically derivatizing composition is a liquid chemically derivatizing composition comprising a acylating agent suspended or dissolved in a non-aqueous liquid phase of an organic solvent such as for example toluene, acetone or mixtures thereof, and the liquid phase preferably provides for more than 95 wt %, or essentially the entire liquid (100 wt %) comprised in the liquid reaction mixture.

A microfluidic device uses one or more hydraulic intensifier pump to convey the reaction mixture through one or more microfluidic channel, which are machined into a resistant material such as metal, ceramic, or diamond. This is also known as the microfluidic interaction chamber (IXC). In the microfluidic interaction chamber (IXC), the liquid reaction mixture is then subjected to high shear or tensile stress to afford delamination. The latter construction is commonly referred to as a microfluidic interaction chamber (IXC). An example of such a microfluidizer, would be an M110-EH Microfluidizer Processor manufactured by Microfluidics Corporation, Westwood, Mass., USA.

The microfluidic device relies on the generation of high mechanical stress within the fluid to achieve break down or delamination of the cellulosic feedstock into the desired cellulose nanofibrils or nanocellulose. This is achieved by pumping the fluid formulation through a well-defined microfluidic interaction chamber—effectively a situation corresponding to a confined flow, as defined in the field of fluid dynamics. The term microfluidic, in the context of the present invention, refers to a confined flow geometry, microfluidic channel or interaction chamber (these terms being synonymous within the context of the present invention) where the width orthogonal to the direction of flow is less than 500 microns, preferably between 400 and 50 microns. Commonly encountered interaction chamber designs include abrupt contractions (either axisymmetic or rectangular slots), Z-geometries (abrupt inflections in the path of the flow in combination with an abrupt contraction) and Y-geometries (where the flow is split and recombined as impinging/opposing jets). Each of the above interactions chamber designs are regarded as creating a complex flow, where the kinematics are such that both shear and tensile effects coexist. Correspondingly, it is impossible to define a single value of shear rate in complex flows of this type. This situation is clearly different to a so-called rheometrical flow—where the shear rate, shear stress and boundary continuous are well-defined, allowing material properties such as viscosity and first normal stress difference to be assigned a value characteristic of the fluid. Furthermore, geometries involving convergence of the streamlines/acceleration of the fluid (contractions, Z-geometries) or generation of a stagnation point (Y-geometry/opposing jets) are characterised by a high tensile or extensional component within the flow field—which makes a major contribution to the efficiency of mechanical delamination. This, however, further complicates definition of a characteristic shear rate for the process.

The term 'high shear', within the scope of the present invention, is best clarified via an illustrative example of the shear rate in a 50 micron radius (R) axisymmetric capillary (which may be considered as part of e.g. an interaction chamber of Z-geometry used on an M110-EH Microfluidizer). A batch of 500 ml of a given composition (comprising precursor cellulosic material and chemically derivatizing composition) was seen to pass through such an interaction in 2 minutes at a operating pressure (P) of 25000 psi (172 MPa). This corresponds to a volumetric flow rate (Q) of 4.16 ml min$^{-1}$ and thus a shear rate (assuming steady flow and making no allowance for shear thinning of the fluid) of 42.4×10$^6$ s$^{-1}$.

Shear rate ($\dot{\gamma}$) in capillary (Poiseuille) flow may be conveniently estimated via the following expression:

$$\dot{\gamma} = \frac{4Q}{\pi R^3}$$

Given that the flow in e.g. the M110-EH Microfluidizer is pulsatile in character, the true peak value of the shear rate in this part of the interaction geometry could be much higher. The operating range of processing apparatus of the microfluidizer corresponding to the present invention is between 8.5×10$^6$ s$^{-1}$ and 102×10$^6$ s$^{-1}$ (defined as above) and 5000 psi to 60000 psi (34.5 MPa to 414 MPa), most preferably above 34×10$^6$ s$^{-1}$ within this range and preferably above 20000 psi (138 MPa) within this range.

Within the meaning of the present invention, the term high shear conditions therefore refers to a shear rate in excess of 8.5×10$^6$ s$^{-1}$, preferably of from 8.5×10$^6$ s$^{-1}$ to 102×10$^6$ s$^{-1}$, and more preferably of from 34×10$^6$ s$^{-1}$ to 102×10$^6$ s$^{-1}$.

In a preferred embodiment of the present invention, the smallest dimension of the microfluidic channel in the microfluidic device is advantageously between 400 microns and 50 microns, more preferably less than 150 microns or of from 50 micron to 150 micron.

In a preferred embodiment of the present invention, the interaction chamber of the microfluidic device has a Z geometry.

In the method according to the invention, the formed liquid reaction mixture is thus subjected to high shear conditions, and most preferably is subjected to microfluidisation.

When the formed liquid reaction mixture is subjected to high shear conditions, the precursor cellulosic material contained is comminuted and delaminated in a manner that allows the formation of nanofibrils of smaller diameter and greater surface area.

It has been found that microfluidisation yields a superior degree of substitution (DS) when compared to other types of processing such as homogenization and furthermore allows retaining a homogenous nanofibril width distribution of the produced chemically derivatized nanocellulose.

When the liquid reaction mixture is subjected to processing at high shear, the liquid reaction mixture enters the microfluidizer via an inlet reservoir and is powered by a high-pressure hydraulic intensifier pump into a fixed geometry interaction chamber at speeds up to 400 ms$^{-1}$. The resulting microfluidized liquid reaction mixture is then effectively cooled, if required, and collected in the output reservoir. The high shear that can be achieved by a microfluidizer is in excess of 10$^6$ s$^{-1}$.

In a preferred embodiment of the method according to the invention, the chemically derivatizing composition comprises, or consists of, an acylating agent, and optionally further comprises, or further consists of, an acid or a base as a catalyst. In essence, the acylating agent will form a ester moiety at the hydroxyl moieties of the anhydroglucose units, and this is generally done to impart hydrophobicity to the surface of the nanocellulose fibrils, which can be tailored through the choice of acylating agent, and in particular by choosing the length of the hydrocarbon group of the moiety. The acylating agent can be for example aa carboxylic acid or an anhydride thereof, like for example an acetylating agent such as acetic acid or a propionating agent such as propionic acid or an alkenyl carboxylate or alkyl carboxylate or a succinylating agent such as succinic acid anhydride. In the case the acylating agent is a carboxylic acid anhydride such as succinic acid anhydride, the liquid phase is a non-aqueous phase and comprises, or consists of, an organic solvent such as acetone or toluene. The catalyst, if present, is a nucleophilic catalyst such as for example pyridine.

In the case where the acylating agent is a carboxylic acid such as for example acetic acid or propionic acid, the catalyst, if present, is an acid that is most preferably unable to chemically derivatize the surface of the cellulosic material. Examples of such acids are hydrogen halides such as hydrogen chloride or hydrogen bromide.

In the case where the acylating agent is an alkenyl or alkyl carboxylate such as for example a vinyl carboxylate, the catalyst, if present, is a base that is most preferably unable to chemically derivatize the surface of the cellulosic material. Examples of such bases are a non-nucleophilic base such as 1,8-diazabicyclo[5.4.0]undec-7-ene (DBU). In a much preferred embodiment, the chemically derivatizing composition essentially consists of an alkenyl or alkyl carboxylate, such as a vinyl carboxylate, and a non-nucleophilic base catalyst, such as DBU. In this case, the precursor cellulosic material consists of a suspension of precursor cellulosic material in a organic solvent which is not capable of swelling cellulose, such as acetone. As an example the precursor cellulosic material may be nanocellulose dispersed in acetone. As an example, a vinyl carboxylate suitable for use in the method of the present invention is vinyl laurate.

In a preferred embodiment of the method according to the invention, the chemically derivatizing composition comprises a halogenated triazine, preferably a halogenated 1,3,5 triazine according to formula (I), where X can independently be a N-morpholinyl, halogen, preferably a chlorine or a bromine, where Y can independently be N-morpholinyl, a halogen, preferably a chlorine or a bromine, and R can independently be an alkyl chain or a chromophore. In much preferred embodiment of the method according to the invention, the derivatizing composition comprises a halogenated 1,3,5 triazine according to formula (I), where X is N-morpholinyl, where Y is a halogen, and where R is an alkyl chain or a chromophore.

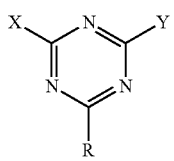

(I)

In a preferred embodiment of the method according to the invention, the chemically derivatizing composition comprises an aqueous solution of TEMPO, optionally further comprising a molar excess of a bromide salt, such as for example sodium bromide, with respect to the molar amount of TEMPO.

In a preferred embodiment of the method according to the invention, the chemically derivatizing composition comprises an aqueous solution of a metaperiodate salt such as sodium metaperiodate, where the amount of metaperiodate corresponds at least to a 4- or 5-fold molar excess with respect to the anhydroglucose units of precursor cellulosic material or the nanocellulose. In a much preferred embodiment, the aqueous solution of a metaperiodate salt is buffered to an acidic pH. A suitable buffer may for example be an acetate buffer.

In a preferred embodiment of the method according to the invention, the chemically derivatizing composition comprises ceric ammonium nitrate (CAN) and is preferably an aqueous solution of ceric ammonium nitrate. Ceric ammonium nitrate (CAN) undergoes a redox reaction with the constituent anhydroglucose units of the cellulose, cleaving the C2-C3 bond with concomitant generation of an active free radical centre, which facilitates the subsequent grafting of the cellulose with a grafting agent (via a process of addition polymerization). Such a grafting agent can either be comprised in the chemically derivatizing composition or can be added to the liquid reaction mixture after the ceric ammonium nitrate has reacted to oxidize the anhydroglucose units of the cellulose chain. Suitable grafting agents are (meth)acrylic acid or esters thereof, such as for example methacrylic acid, acrylic acid, ethyl methacrylate and ethyl acrylate.

In a preferred embodiment of the method according to the invention, the chemically derivatizing composition comprises a vinyl sulfone, preferably a substituted vinyl sulfone according to formula (II), where R can independently be a chromophore or a hydrophobic moiety.

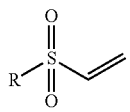

(II)

Chemically derivatized nanocellulose can be used in multiple applications, such as for example as reinforcing agent in polymer compositions. In order to obtain chemically derivatized nanocellulose, it is important to subject the precursor cellulosic material to a shear of more than $10^6$ s$^{-1}$, such as to ensure a sufficient delamination of the precursor cellulosic material into nanocellulose. In the context of the present invention, nanocellulose may be defined as a fibrillar cellulosic material wherein the mean fibril width is preferably below 30 nm.

It is another object of the present invention to provide chemically derivatized nanocellulose obtained according any of the methods of the present invention, as described above.

It is yet another object of the present invention to provide a polymer composition comprising chemically derivatized nanocellulose obtained according any of the methods of the present invention, as described above, where the polymer may be chosen in general from polyolefins or polycondensates, such as from polyethylene, polypropylene, polyamide, polyester, or polyurethane.

In reactions where the accessible surface hydroxyl groups act as nucleophiles during the concomitant mechanical delamination and surface chemical modification of the cellulose fibrils, the extent of chemical derivatization is formally quantified in terms of a mean degree of substitution (DS, the mean number of hydroxyl groups per anhydroglucose residue which are substituted—varying in value from 0 to maximum 3). In the case of the present invention, chemical derivatisation is restricted to the surface of the cellulose fibrils, so the mean DS is correspondingly low, i.e. significantly below 1. For the chemically derivatized nanocellulose obtained according to the method of the present invention, the range in mean DS is between 0.05 and 0.30, preferably between 0.15 and 0.30.

In reactions involving the generation of free radical centres on the cellulose chain via redox scission of the C2-C3 bond (in the presence of e.g. Ce (IV) ammonium nitrate) and subsequent grafting of acrylic monomers to form cellulose fibrils or nanofibrils with grafted polymer chains, the extent of surface chemical modification may be expressed by means of the weight % of the final product comprising the grafted chains—calculated by the increase in mass afforded by the said grafting reaction. For the chemically derivatized nanocellulose obtained according to the method of the present invention, the extent of grafting varies between 5% and 500%, most preferably between 20% and 100%.

Following the concomitant mechanical delamination and surface chemical modification of the cellulose precursor material, the morphology of the resultant fibres of the desired product may be characterised in terms of the statistical distribution of nanocellulose fibril widths so produced. In this manner, the resultant quality of the chemically derivatized cellulose fibrils may be determined by the technique of field emission scanning electron microscopy (FE-SEM), whereby a dilute aqueous suspension of the material of interest is allowed to dry on a mica substrate, sputter coated with a conductive material and presented to the microscope. The resultant images are then analysed via a suitable digital image analysis software package (e.g. Image J—freeware) and the arithmetic mean of a statistically significant number of fibril width measurements taken (>500). The distribution of fibril widths may be further defined by the corresponding standard deviation or, more preferably by the polydispersity index (ratio of the number average fibril width to the weight average fibril width). For the chemically derivatized nanocellulose obtained according to the method of the present invention, the mean nanocellulose fibril width produced is in the range 3 to 1000 nm, preferably in the range of 8 to 30 nm. The corresponding polydispersity in fibril is preferably in the range of 1.03-5.00, most preferably between 1.05 and 1.3.

EXAMPLES

Example 1A

Surface Acetylation of Solid Cellulose Nanofiber (CNF) Using Aqueous Acetic Acid Via a Batch Process The nanocellulose substrate was derived from bleached eucalyptus sulphite dissolving pulp (DP~800), received in sheet form, that was first shredded and soaked in a swelling medium of 78% w/w aqueous morpholine. The swollen pulp suspension was then processed (×5 passes) through a M-110-EH Microfluidizer Processor (Idex Corp), fitted with a 200 micron ceramic auxiliary processing unit and 100 micron diamond interaction chamber (H-10Z). The nanocellulose was isolated as a dry powder by washing into water via multiple centrifugation/decantation steps and subsequent freeze drying Dry nanocellulose (4.0 g) was weighed into a 1 litre reaction flask along with 800 g glacial acetic acid and the mixture dispersed for 10 minutes at 10,000 rpm using an Ultraturrax mixer. The flask was fitted with a lid equipped with a condenser, thermometer, and heated on a hotplate with magnetic stirring. When the temperature reached 80° C., concentrated hydrochloric acid (1.8 ml) was added and stirring was continued at 80-85° C. for 2 hours, before being allowed to cool with stirring.

The dispersion was centrifuged to remove the acidic liquid phase and was redispersed with fresh water before a second centrifugation to remove most of the acid. The solid was again redispersed with fresh water at ~1% and stirred vigorously whilst the pH was adjusted to >6 with 1M sodium carbonate solution. The dispersion was then subjected to more centrifugation/wash cycles until the conductivity fell to <5 µScm$^{-1}$. The solid was then re-dispersed a final time in fresh water before being freeze-dried (VirTis SP Scientific Sentry 2.0).

The extent of surface acylation of the nanocellulose was determined by ATR-FTIR spectroscopy using a Perkin Elmer FTIR Frontier spectrophotometer fitted with a KRS-5 crystal. Spectra were recorded with 16 scans, with a resolution of 4 cm$^{-1}$, over the range 4000-450 cm$^{-1}$. The data were processed using PerkinElmer Spectrum software, plotting absorbance as ordinate. An apparent degree of substitution (DS) was estimated from the ratio of the heights of the ester carbonyl stretch peak at 1738 cm$^{-1}$ and the peak corresponding to the —C—O—C— deformation of the saccharide units at 1160 cm$^{-1}$. The measured peak ratio was converted into an apparent DS value by reference to a known calibration standard of commercial cellulose triacetate (reported DS=2.48). The peak ratio $A_{1738}/A_{1160}$=8.75 for the calibration standard. The apparent DS may therefore be estimated from the peak ratio for a given sample as follows:

$$DS = (A_{1738}/A_{1160}) \times (2.45/8.75)$$

The apparent DS for this product was 0.4

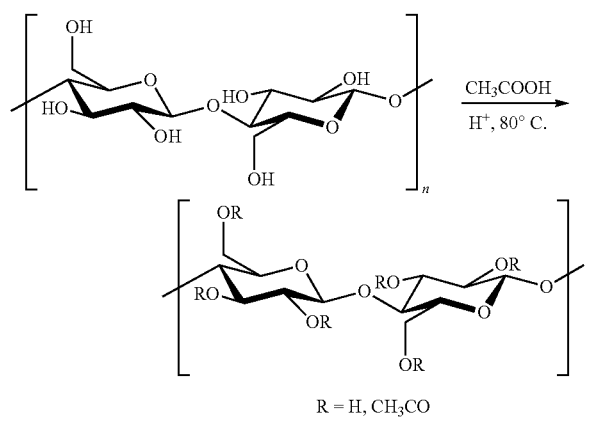

Example 1B

Simultaneous Surface Acetylation and Nanofibrillation of Cellulose Using Aqueous Acetic Acid A cellulose suspension in water (200 g) previously prepared in a refiner (dry solids content~3.1%) was centrifuged and the water replaced stepwise with glacial acetic acid until a 0.5% dispersion was obtained having a solvent composition of 90% acetic acid and 10% water. The dispersion was stirred manually before being introduced to a microfluidiser (model M110-P, Idex Corp) and processed three times through two interaction chambers with 400 µm and 200 µm channels connected in series, using a processing pressure of 25,000 psi. Concentrated hydrochloric acid (36%, 2 g) was then added to the mixture and it was processed another seven times through a second geometry consisting of a 200 µm auxiliary and 100 µm interaction chamber connected in series. The apparent D.S. was measured as for Example 1A and was 0.5.

Example 2A

Heterogeneous Transesterification of Nanocellulose Prepared by Refining in Water with a Continuous Phase Exchange into Vinyl Laurate A nanocellulose suspension in water (350 g) previously prepared in a refiner (dry solids content~3.1%) was subjected to a process of continuous phase exchange via diafiltration using a 50 nm pore size PTFE membrane in which the original aqueous continuous phase was replaced with an equivalent volume of acetone. Further acetone was added to lower the viscosity as required. To this nanocellulose suspension in acetone was added vinyl laurate (1070 g) and the acetone removed under reduced pressure. To this resultant suspension of nanocellulose in the alkenyl carboxylate in a 2 litre 5-necked reactor fitted with overhead stirrer and condenser was added 1,8-diazabicyclo[5.4.0]undec-7-ene (10.20 g, 67.0 mmol) and the system maintained at 70° C. for 3 hours with continuous agitation. During this time the colour of the reaction medium changed gradually from pale yellow to dark brown. On cooling to ambient temperature, the product was collected at the pump on a sinter and excess vinyl laurate removed, before washing with several aliquots of hexane (total 800 g). On drying in a vacuum oven (20° C., 100 mbar) the product (nanocelluose with lauryl surface modification) was obtained as a finely divided white solid with apparent degree of substitution of 0.23 (ATR FTIR, method as Example 1A).

Example 2B

Heterogeneous Transesterification of Nanocellulose Prepared by Refining in Water, Via a High-Shear Microfluidizer Process Using Vinyl Laurate A nanocellulose suspension in water (100 g) previously prepared in a refiner (dry solids content~3.1%) was subjected to a process of continuous phase exchange via diafiltration using a 50 nm pore size PTFE membrane in which the original aqueous continuous phase was replaced with an equivalent volume of acetone. Further acetone was added to lower the viscosity as required. To this nanocellulose suspension in acetone was added vinyl laurate (600 g) and the acetone removed under reduced pressure. The resulting suspension (~0.5% solids) was then processed (×3 passes) through a M-110-P Microfluidizer Processor (Idex Corp), fitted with 400 micron and a 200 micron diamond interaction chambers connected in series.

To the partially processed suspension was added 1,8-diazabicyclo[5.4.0]undec-7-ene (5.64 g, 37.0 mmol, 2 eq per AGU) and the resulting mixture processed (7 passes) through the microfluidiser using a 200 micron ceramic auxiliary processing unit and 100 micron diamond interaction chamber (H-10Z) connected in series. The product was isolated using the method described in Example 2A and had a D.S. of 0.27 (ATR FTIR, method as Example 1A)

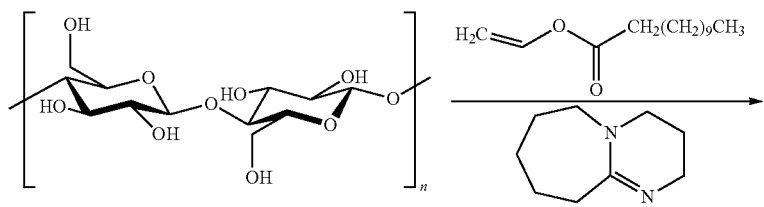

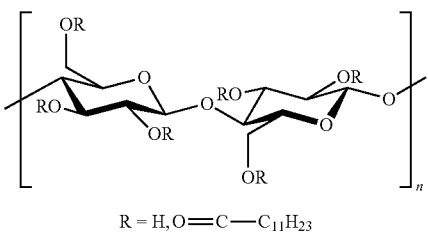

R = H, O=C—C$_{11}$H$_{23}$

Example 3A

Surface Modification of Nanocellulose Prepared by Refining in Water, with a Vinyl Sulphone A nanocellulose suspension in water (200 g) previously prepared in a refiner (dry solids content~3.1%) was diluted with water to a solids content of ~1%. Compound I (6.0 g, 12.3 mmol, eq to 2 mol per mol anhydroglucose unit) was dissolved in water by adjusting the pH to 5 with aqueous sodium carbonate solution (1M). The solution was mixed with the nanocellulose suspension using an Ultraturrax mixer at 10,000 rpm for ten minutes and transferred to a reaction flask mounted on a magnetic hotplate and fitted with a condenser and thermometer. The reaction mixture was heated to 60° C. and a solution of sodium hydroxide (12 g, 1M, 12 mmol) added. The system was maintained at 60° C. for 90 minutes, before being allowed to cool to ambient temperature. The modified cellulose was isolated by repeated washing and centrifugation with distilled water before freeze-drying. The D.S. was calculated from the percentages of nitrogen and sulfur content determined by elemental analysis and found to be 0.2.

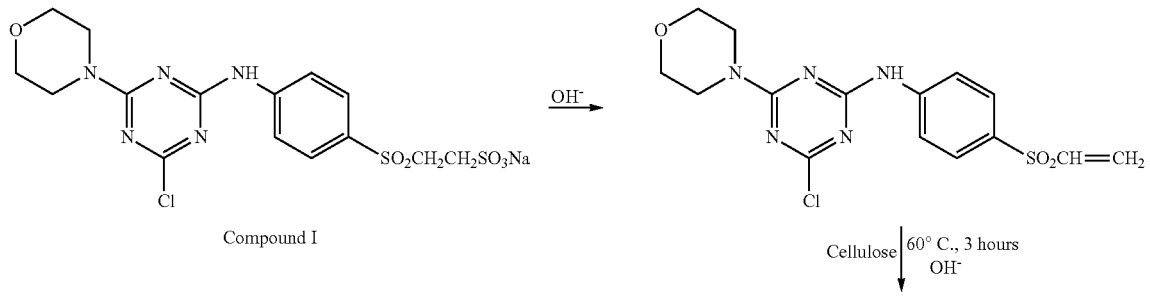

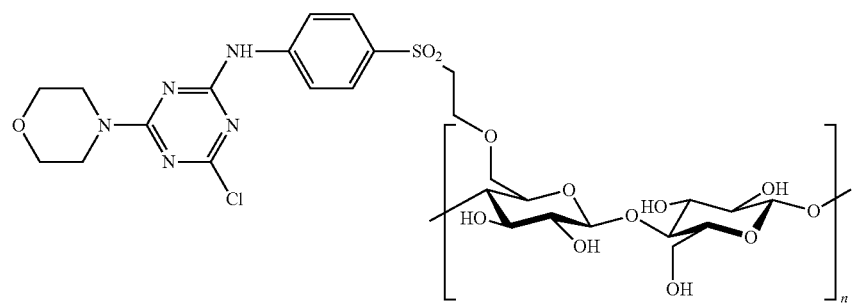

Example 3B

Surface Modification of Nanocellulose Prepared by Refining in Water, with a Vinyl Sulphone Prepared by High-Shear Microfluidiser Processing A nanocellulose suspension in water (300 g) previously prepared in a refiner (dry solids content~3.1%) was diluted with water (to a solids content of ~0.5%). A solution of Compound I (9.0 g, 18.5 mmol) in water (120 g) was mixed with the nanocellulose suspension and the mixture was then processed (×3 passes) through a M-110-P Microfluidizer Processor (Idex Corp), fitted with 400 and 200 micron diamond interaction chambers connected in series.

To the partially processed suspension was added sodium hydroxide solution (18.5 g 1M, 18.5 mmol) and the resulting mixture processed (7 passes) through the microfluidiser using a 200 micron ceramic auxiliary processing unit and 100 micron diamond interaction chamber (H-10Z) connected in series. The product was isolated as per Example 3A. The D.S. was determined by elemental analysis and found to be 0.25.

Example 4A

Surface-Grafting of Nanocellulose, Refined in Water, with Acrylic Acid Using Ammonium Cerium (IV) Nitrate Catalyst A nanocellulose suspension in water (1000 g) previously prepared in a refiner (dry solids content~3.1%) was processed using a microfluidiser (Microfluidics M110-EH30), the first 2 passes using two ceramic 200 micron auxiliary processing modules (APM) (H302 APM) in series, while the last 3 passes were performed after exchanging one of the APMs for a 100 micron diamond interaction chamber. The dispersion was washed free of biocide by twice centrifuging and decanting the supernatant, replacing with fresh water. The recovered paste had a solid content of 3.4%. A portion of this (259.3 g, equivalent to ~9 g of cellulose, was re-dispersed into HNO3 (800 ml, 0.1M) and homogenised using an Ultra-Turrax at 13000 rpm for 20 mins. Ammonium cerium (IV) nitrate (2.1918 g, 4.0 mmol) was dissolved in HNO3 (200 ml. 0.1M). Acrylic acid (50 ml) was passed through a column of activated alumina to remove the inhibitor yielding 43.9 ml of purified acid, which was placed into a dropping funnel. The cellulose dispersion was purged with Nitrogen for 15 mins prior to addition of the ammonium cerium (IV) nitrate solution, and the reaction mixture was kept under a nitrogen atmosphere throughout. The acrylic acid was slowly added to the mixture via dropping funnel. The reaction was stopped after 3 hrs by washing down the dispersion with H2O via centrifugation (10000 rpm for 10 mins plus another 2 washes at 10000 rpm for 30 mins).

Grafting Efficiency

The grafting efficiency was calculated as follows:

% $GE = 100 \times (w1-w2)/w2 = 100 \times (w3/w2)$

Where w1 is the weight of the grafted co-polymer, w2 the weight of cellulose, and w3 the weight of the grafted polymer, i.e. poly(acrylic acid).

The amount of AA grafted to the cellulose backbone was determined by acid-base titration on a dialysed portion of product. Carboxyl acid groups on PAA were consumed by excess NaOH (0.12M) and the remaining NaOH was titrated by HCl (0.12M), using phenolphthalein (PhP) as indicator. The GE was 15%

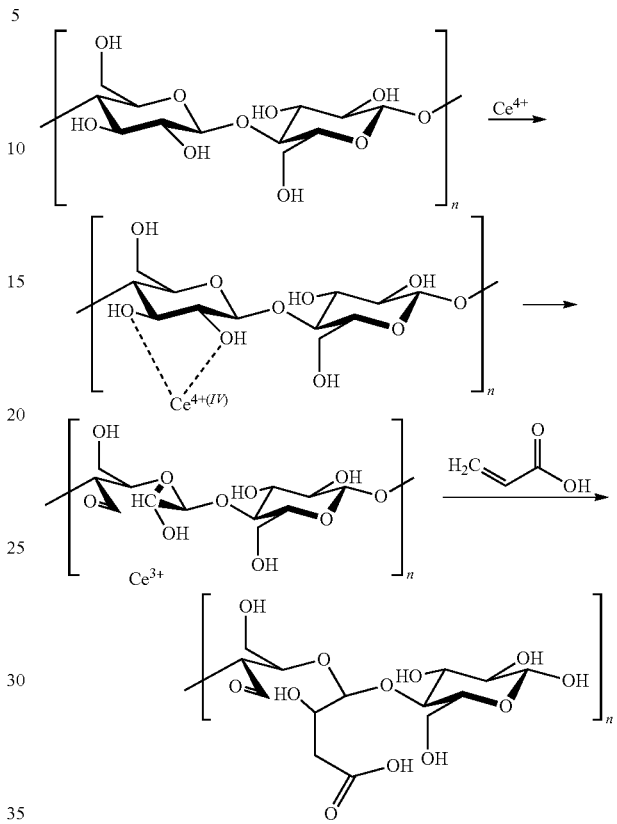

Example 4B

Simultaneous Nanofibrillation and Surface-Grafting of Nanocellulose with Acrylic Acid Using Ammonium Cerium (IV) Nitrate Catalyst A nanocellulose suspension in water (212.8 g) previously prepared in a refiner (dry solids content~3.1%) was diluted with HNO3 (720 ml, 0.1M) then processed (×3 passes) through a M-110-P Microfluidizer Processor (Idex Corp), fitted with 400 and 200 micron diamond interaction chambers connected in series.

Ammonium cerium (IV) nitrate (1.97 g, 3.6 mmol) was dissolved in HNO3 (200 ml, 0.1M). Acrylic acid (45 ml) was passed through a column of activated alumina to remove the inhibitor yielding 39.8 ml of purified acid. The cellulose dispersion was purged with nitrogen for 15 mins before addition of the ammonium cerium (IV) nitrate solution then subjected to one pass through a microfluidiser fitted with a 200 micron ceramic auxiliary processing unit and 100 micron diamond interaction chamber (H-10Z) connected in series. A portion (5 ml) of the purified acrylic acid) was added to the mixture which was briefly purged with nitrogen before passing through the microfluidiser. This procedure was repeated another 7 times until all the acrylic acid had been added then another 2 passes were performed before the reaction was stopped by washing down the dispersion with H2O via centrifugation (10000 rpm for 10 mins plus another 2 washes at 10000 rpm for 30 mins). The grafting efficiency was 22% (determined by titration as for Example 4A)

Example 5A

TEMPO-Mediated Oxidation of Solid Nanocellulose Using Sodium Hypochlorite

Cellulose in the form of dry pulp sheets (Eucalyptus, Saiccor, South Africa) was soaked in 78% aqueous morpholine at 1% w/w and the mixture agitated daily by rotor stator mixer (IKA Ultra Turrax T25) to aid swelling and processability. After 7 days, the mixture was subjected to high shear, high pressure processing in a microfluidiser (Idex Corp, 5 passes). The morpholine content of the processed sample was reduced to <0.5% by repeated centrifugation/washing steps after which it was freeze dried to give dry solid CNF.

TEMPO-Mediated Oxidation.

The CNF fibers (1 g) were suspended in water (100 mL) containing TEMPO (0.016 g, 0.1 mmol) and sodium bromide (0.1 g, 1 mmol). NaClO solution (3.10 g, 12%, 5 mmol) was adjusted to pH 10 by the addition of 0.1 M HCl. The NaCl solution was added to the cellulose dispersion and the mixture stirred at room temperature with an Ultra-Turrax at 500 rpm. The pH was maintained at 10 by adding 0.5 M NaOH solution until the pH stabilised. The TEMPO-oxidized cellulose was thoroughly washed with water by filtration and stored at 4° C. before further treatment or analysis. The carboxylate content of the TEMPO-oxidized cellulose was 0.69 mmol g$^{-1}$, determined by conductometric titration

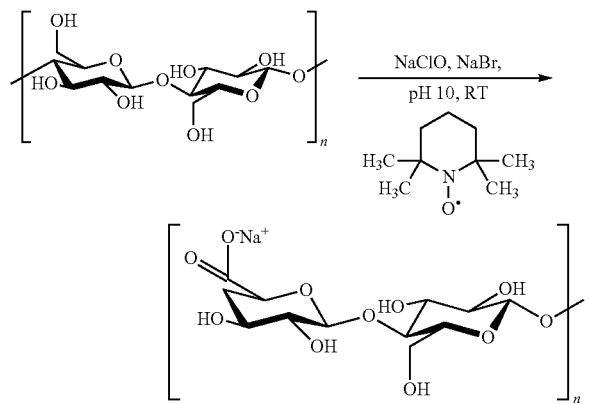

Example 5B

Simultaneous Nanofibrillation and TEMPO-Mediated Oxidation of Solid Nanocellulose Using Sodium Hypochlorite A cellulose suspension in water (200 g) previously prepared in a refiner (dry solids content~3.1%) was diluted with distilled water to give a solids content of 1% (615 mL), before addition of TEMPO (0.096 g, 0.6 mmol) and sodium bromide (0.6 g, 6 mmol). NaClO solution (18.6 g, 12%, 30 mmol) was adjusted to pH 10 by the addition of 0.1 M HCl before adding to the cellulose dispersion. The dispersion was then processed (×7 passes) through a M-110-P Microfluidizer Processor (Idex Corp), fitted with 200 micron auxiliary chamber and a 100 micron diamond interaction chambers connected in series. After each pass, the pH was measured and adjusted back to 10 with 0.5M NaOH. The TEMPO-oxidized cellulose was thoroughly washed with water by filtration and stored at 4° C. The carboxylate content was 1.15 mmol g$^{-1}$, determined by conductometric titration.

Example 6A

Periodate Oxidation of Solid Nanocellulose Followed by Reductive Amination with 1-Butylamine Preparation of 2,3-dialdehyde cellulose (DAC).

Dry CNF was prepared from pulp as described in Example 5A. 12 g of dry CNF in 900 mL of acetate buffer (pH 5.5), was mixed with 79 g of sodium metaperiodate (about 5 mol per mol of anhydroglucose units) dissolved in 900 mL of pH 5.5 buffer and the mixture dispersed using an Ultra-Turrax mixture at 12000 rpm. The periodate-containing reaction mixture was carefully wrapped in aluminum foil to avoid light exposure, and 180 mL of 1-propanol was added to the reaction mixture to serve as a radical scavenger. The reaction mixture was vigorously stirred at room temperature in the dark for 50 hours, after which the reaction was quenched via the addition of ethylene glycol. The cellulose was washed repeatedly with water to provide pure DAC.

The degree of oxidation (D.O.) is defined as the mole fraction of C2, C3-alcohols in the anhydroglucose units that have been transformed into their corresponding dialdehydes. Determination of D.O. was carried out as follows: To a stirred 100 mL RB-flask was added never-dried DAC (corresponding to a dry weight of 100 mg), 40 mL of acetate buffer (pH 4.5), and 1.65 mL of hydroxylamine solution (aqueous, 50 wt %). The reaction mixture was stirred at room temperature for 24 h. The product was thoroughly washed with water and dried under reduced pressure prior to elemental analysis. The D.O. was calculated to be 61% which corresponds to approximately 7.6 mmol of aldehyde groups per gram of cellulose.

DAC (2.0 g) was redispersed in acetate buffer (200 mL, pH 4.5, acetic acid/sodium acetate) and stirred for 15 min. Butylamine (4.51, 61.7 mmol, 5 eq. per glucose unit) was then slowly added to the dispersion and the mixture was continuously stirred at 45° C. for 6 hours. A solution of sodium borohydride (1.20 g, 30.8 mmol, 2.5 eq. per glucose unit) in water (10 ml) was added and the dispersion stirred for a further 3 hours. The product was repeatedly washed with distilled water and then dialyzed (MWCO: 12-14,000) against water until the pH was neutral and subsequently, freeze-dried to obtain the dry product with a yield of 80-90%. The D.S. of amine (theoretical maximum=2 per anhydroglucose unit) was calculated from the nitrogen content as determined from elemental analysis. The nitrogen content was 2.0% corresponding to a D.S. of 0.38

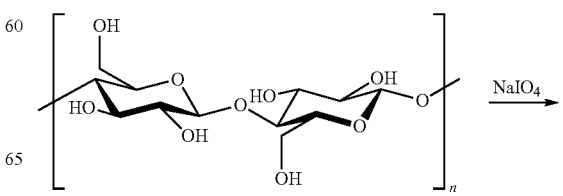

-continued

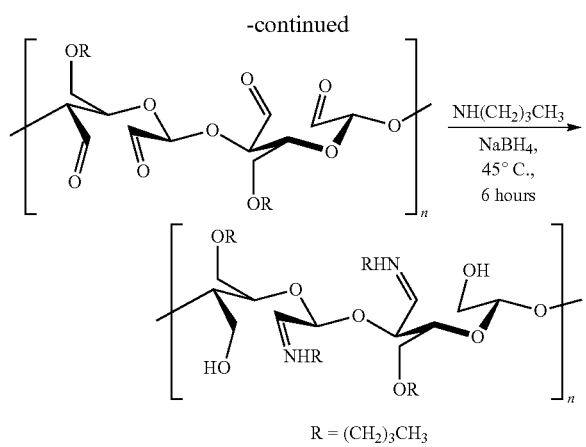

R = (CH$_2$)$_3$CH$_3$

Example 6B

Simultaneous High Shear Processing of and Periodate Oxidation of Cellulose Refined in Water, Followed by Reductive Amination with 1-Butylamine A nanocellulose suspension in water (390 g) previously prepared in a refiner (dry solids content~3.1%) was subjected to repeated centrifugation/washing and the water replaced stepwise with acetate buffer (pH 4.5) then diluted to a volume of 900 ml. The dispersion was mixed with 79 g of sodium metaperiodate (about 5 mol per mol of anhydroglucose units) dissolved in 200 mL of pH 4.5 buffer and the mixture dispersed using an Ultra-Turrax mixture at 12000 rpm. The dispersion was then processed (×15 passes) through a M-110-P Microfluidizer Processor (Idex Corp), fitted with 200 micron auxiliary chamber and a 100 micron diamond interaction chambers connected in series. The radical scavenger (1-propanol, 180 ml) was added after the first two passes. The inlet reservoir and outlet container of the microfluidiser were covered as much as possible to prevent exposure of the dispersion to light. After processing was complete the DAC was thoroughly washed with water by filtration and stored in darkness at 4° C. The D.O. was calculated to be 75% which corresponds to approximately 9 mmol of aldehyde groups per gram of cellulose.

DAC (6.0 g) was redispersed in acetate buffer (600 mL, pH 4.5, acetic acid/sodium acetate) and stirred for 15 min. Butylamine (13.53, 185 mmol, 5 eq. per glucose unit) was then slowly added to the dispersion and the mixture was processed again through a microfluidiser (10 passes with 200/100 chamber sequence). A solution of sodium borohydride (3.60 g, 92.4 mmol, 2.5 eq. per glucose unit) in water (30 ml) was added after 6 passes. The product was repeatedly washed with distilled water and then dialysed (MWCO: 12-14,000) against water until the pH was neutral and subsequently, freeze-dried to obtain the dry product with a D.S. of 0.7.

Example 7A

Periodate Oxidation of Nanocellulose Followed by Oxidation and Sulfonation with Sodium Bisulfite Dry CNF was prepared from eucalyptus pulp as described in Example 5. Dry CNF (3.00 g) was dispersed into distilled water (600 mL) using an Ultra-Turrax mixer. Sodium periodate (4.04 g, 18.9 mmol, 5 eq per AGU) was added and the dispersion was stirred for three days at room temperature in absence of light. The product was filtered, repeatedly washed with DI water, and then freeze-dried.

Sulfonation of 2,3-dialdehyde cellulose

The 2,3-dialdehyde cellulose (3.00 g) was dispersed in deionized water (300 mL) and sodium bisulfite (4.75 g, 43.24 mmol). After stirring for 72 hours at room temperature, the product was washed repeatedly with distilled water, then dialyzed using cellulose acetate membrane (MWCO 5000) followed by freeze drying. The sulfonic acid content of the dried cellulose, determined by conductometric titration with 0.05N sodium hydroxide solution, was 1.4 mmol g$^{-1}$.

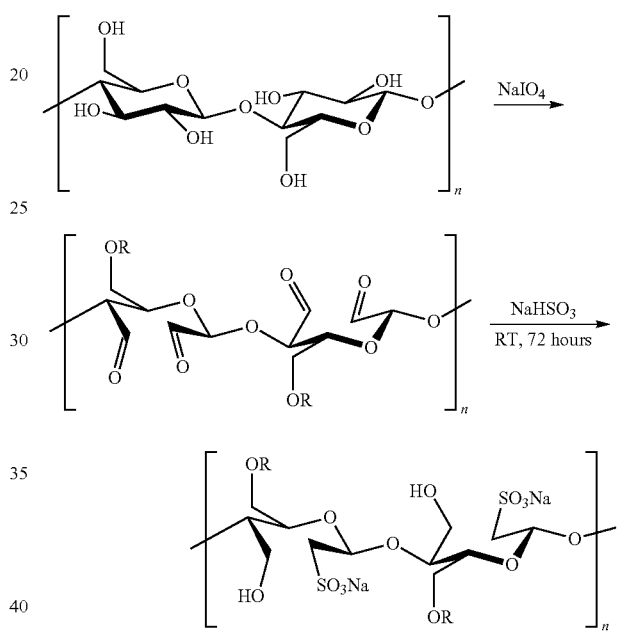

Example 7B

Simultaneous Nanofibrillation and Periodate Oxidation of Cellulose Refined in Water Followed by Sulfonation with Sodium Bisulfite The periodate oxidation and mechanical processing were performed as in Example 6B.

Sulfonation of 2,3-dialdehyde cellulose

Dry 2,3-dialdehyde cellulose (3.00 g) was dispersed in deionized water (300 mL) and sodium bisulfite (4.75 g, 43.24 mmol) was added. The dispersion was then processed (×15 passes) through a M-110-P Microfluidizer Processor (Idex Corp), fitted with 200 micron auxiliary chamber and a 100 micron diamond interaction chambers connected in series. The product was washed repeatedly with distilled water, then dialyzed using cellulose acetate membrane (MWCO 5000) followed by freeze drying. The sulfonic acid content of the dried cellulose, determined by conductometric titration with 0.05N sodium hydroxide solution, was 1.4 mmol g$^{-1}$.

Example 8A

Reaction of Dry Nanocellulose with a Monochlorotriazine

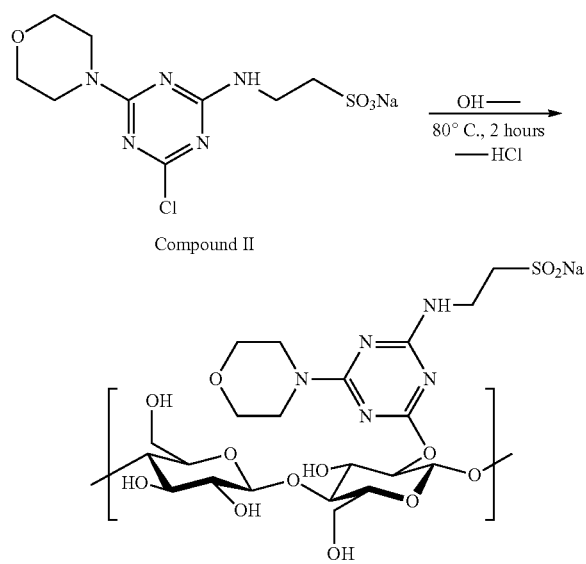

Compound II

Dry CNF was obtained as described in Example 1A. The CNF (2.0 g) and compound II (2.65 g, 8 mmol, 2 eq per anhydroglucose residue) were added to distilled water (200 g) and dispersed using an Ultra-turrax mixer for 10 minutes at 10000 rpm. The mixture was transferred to a reaction flask mounted on a magnetic stirrer hotplate and heated to 80° C. Sodium hydroxide solution (8 g, 1M, 8 mmol) was added and heating continued for 2 hours. The mixture was cooled and the product isolated by repeated washing with distilled water followed by freeze drying. The D.S. (theoretical maximum=3) was calculated using the nitrogen and sulfur contents from the elemental analysis as was determined to be 0.2.

Example 8B

Simultaneous Mechanical Processing of Cellulose and Reaction with a Monochlorotriazine Dry CNF was obtained as described in Example 1A. The CNF (6.0 g) and compound II (7.95 g, 24 mmol, 2 eq per anhydroglucose residue) were added to distilled water (600 g) and processed (×3 passes) through a M-110-P Microfluidizer Processor (Idex Corp), fitted with 400 and 200 micron diamond interaction chambers connected in series.

The mixture was processed again (×6 passes) through a M-110-P Microfluidizer Processor (Idex Corp), fitted with 200 micron auxiliary chamber and a 100 micron diamond interaction chambers connected in series. Sodium hydroxide solution (24 g, 1M, 24 mmol) was added in 6 equal aliquots after each pass and an additional 2 passes were performed after addition was complete. The product was isolated by repeated washing with distilled water followed by freeze drying. The D.S. was found to be 0.24.

Example 9A

Heterogeneous Esterification of Nanocellulose with Succinic Anhydride Via a Batch Process Nanocellulose was isolated as a dry powder as per Example 1A. Dry nanocellulose (16.2 g) was weighed into a 1 litre reaction flask along with pyridine (50 ml), 60 g succinic anhydride and 350 ml toluene and the mixture dispersed for 10 minutes at 10,000 rpm using an Ultraturrax mixer. The flask was fitted with a lid equipped with a condenser, thermometer, and heated on a hotplate with magnetic stirring. The mixture was allowed to stir at 90° C. overnight. After cooling to 60° C., the solid was filtered off and washed with acetone to remove unreacted succinic anhydride. The solid was dried to yield 26.9 g of a white powder.

The sodium salt was prepared by alkaline treatment of the succinylated cellulose with saturated sodium bicarbonate solution. The suspension was stirred at room temperature for 2 h and then filtered. The solid was repeatedly washed with distilled water until the pH was neutral, then washed twice with acetone before drying.

The degree of substitution of the product was determined by addition of excess aqueous 0.02M $NaHCO_3$ solution to the un-neutralised product and back-titrating with 0.02M HCl using methyl orange as the indicator. The titration was repeated three times and the average value of the HCl volume was used for the calculations.

The DS was calculated by using the following equation:

$$DS = (162 \times n\text{COOH})/(m - 100 \times n\text{COOH})$$

where 162 gmol$^{-1}$ is the molar mass of an AGU, 100 gmol$^{-1}$ is the net increase in the mass of an AGU for each substituted succinyl group, m is the weight of the sample analyzed, and nCOOH is the amount of COOH calculated from the obtained value of the equivalent volume of known HCl molarity according to the following equation:

$$n\text{COOH} = V\text{NaHCO}_3 \times C\text{NaHCO}_3 - V\text{HCl} \times C\text{HCl}$$

Using this method the D.S. obtained was gave a concentration of carboxylic functions C(COOH) of 0.81 meq. g$^{-1}$, which corresponds to a succinylation degree (DS) of 0.3.

Example 9B

Simultaneous Surface Succinylation and Nanofibrillation of Cellulose by Refining in Toluene, Via a High-Shear Microfluidizer Process Using Succinic Anhydride A cellulose suspension in water (200 g) previously prepared in a refiner (dry solids content~3.1%) was centrifuged and the water replaced stepwise with toluene using acetone as an intermediate solvent. The dispersion was diluted with more toluene to obtain a 0.5% solids level. The dispersion was stirred manually before being introduced to a microfluidiser (model M110-P, Idex Corp) and processed three times through two interaction chambers with 400 μm and 200 μm channels connected in series, using a processing pressure of 25,000 psi. Succinic anhydride (23 g) and pyridine (19 g) were added to the mixture and it was processed another five times through a second geometry consisting of a 200 μm auxiliary and 100 μm interaction chamber connected in series. The product was then solvent exchanged into acetone via a series of centrifugation/washing steps, before being dried.

The titration method (as per Example 3A) gave a D.S. of 0.6

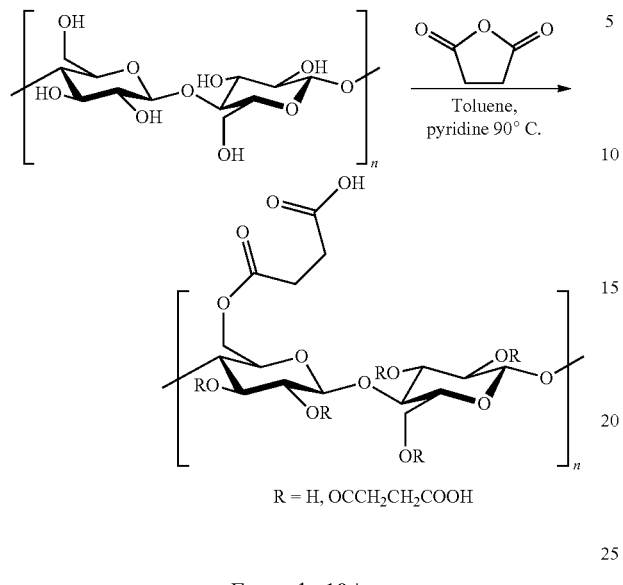

Example 10A

Surface Modification of Nanocellulose with 1,4-Phenylene Diisocyanate Via a Batch Process Nanocellulose fibrils were isolated as a dry powder as per Example 1A. Anhydrous toluene (250 g) was added to a 500 ml flask, along with dibutyltin dilaurate (50 mg). The mixture was stirred and heated to 70° C., before adding a solution of 1,4-phenylene diisocyanate (16 g) in anhydrous dichloromethane (50 g). Once the mixture was homogenous, dry CNF (10 g) added and the reaction mixture was stirred at 70° C. for 24 hours. After cooling to RT, the solid was filtered and transferred to an extraction thimble before being extracted for 6 h with a 1:1 mixture of dichloromethane and toluene with exclusion of moisture. The modified CNF was dried in a vacuum oven at 50° C. A D.S. of 0.3 was determined from the nitrogen content of the elemental analysis.

Example 10B

Simultaneous Surface Modification of Nanocellulose with 1,4-Phenylene Diisocyanate Via a High-Shear Microfluidiser Process An aqueous suspension of cellulose (400 g, 3.1% solids) previously prepared in a refiner (as per Example 1B) was solvent exchanged into anhydrous toluene via a series of centrifugation/washing steps, using 2-propanol as an intermediate solvent. The dispersion was diluted with more toluene to a solids level of 0.8% and introduced to a microfluidiser and processed twice through two interaction chambers with 400 µm and 200 µm channels connected in series, using a processing pressure of 25,000 psi. 1,4-Phenylene diisocyanate (25 g) and dibutyltin dilaurate (100 mg) were stirred into the mixture and it was processed another seven times through a second geometry consisting of a 200 µm auxiliary and 100 µm interaction chamber connected in series. The product was then solvent exchanged into dichloromethane and then acetone via a series of centrifugation/washing steps, before being dried. A D.S. of 0.3 was determined from the nitrogen content of the elemental analysis.

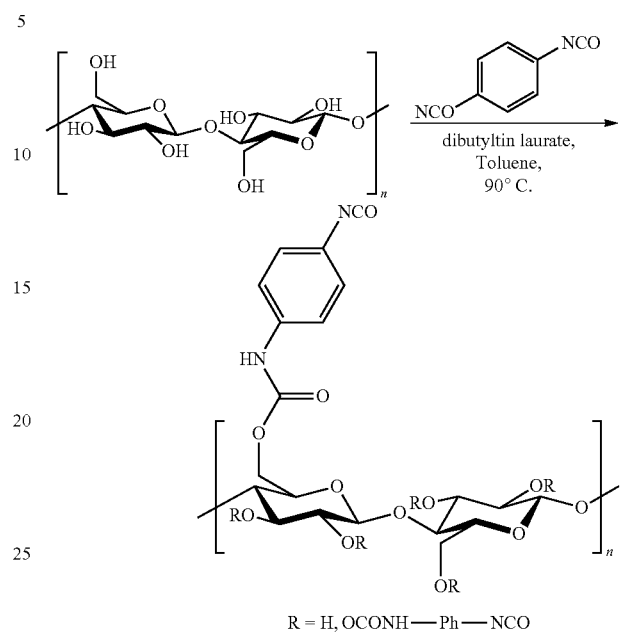

Example 11A

Modification of Cellulose Nanofibrils Via the Surface-Initiated Ring-Opening Polymerisation (SI-ROP) of ε-Caprolactone CNF was obtained as per Example 1A. To a round bottom flask equipped with a magnet, the dry CNF (5.0 g) and ε-caprolactone (100 g) were added along with anhydrous toluene (100 g) and the mixture left under magnetic stirring overnight under nitrogen prior to starting the grafting reaction. The sacrificial initiator, benzyl alcohol (150 µL) was added, followed by the catalyst Sn(Oct)$_2$ (4 ml). Thereafter, the reaction flask was immersed in an oil bath preheated to 90° C. The polymerization was allowed to proceed for 10 hours. After filtration, the solid product was soxhlet extracted in THF at 80° C. overnight to recover ungrafted polymer which was then precipitated by pouring into cold methanol. This was used to estimate the mass of surface-grafted polymer, in this case 46%. The DS was determined by quantitative cross polarization magic angle spinning (CP-MAS) $^{13}$C N.M.R. and was 0.07.

Example 11B

Simultaneous Surface Modification and Nanofibrillation of Cellulose Via the Surface-Initiated Ring-Opening Polymerisation of ε-Caprolactone Using a Batch Reactor Coupled with a Microfluidiser A cellulose suspension in water (100 g, 3.1% solids) previously prepared in a refiner was centrifuged and the water replaced stepwise with anhydrous toluene, using 2-propanol as an intermediate solvent. ε-caprolactone (120 g) was added with mechanical stirring and the resulting dispersion was diluted to ~1% with more toluene. The dispersion was then introduced to a microfluidiser and processed twice through two interaction chambers with 400 µm and 200 µm channels connected in series, using a processing pressure of 25,000 psi. Benzyl alcohol (200 µL) and the catalyst Sn(Oct)$_2$ (5 ml) were then stirred into the mixture, and it was processed another seven times through a second geometry consisting of a 200 µm auxiliary and 100 µm interaction chamber connected in series. The product was then worked up and the conversion and D.S. established as per Example 5A. The conversion was 57% and the D.S. was 0.08.

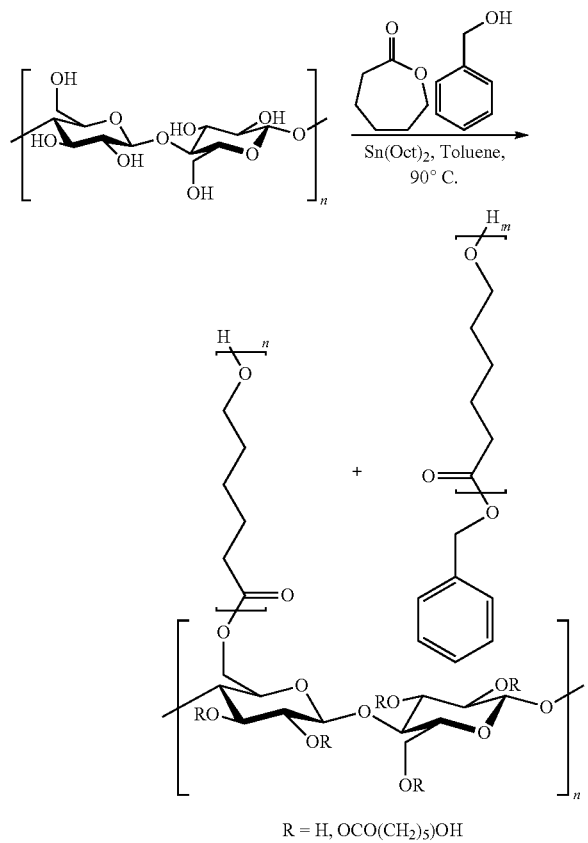

Example 12A

Surface Acetylation of Solid Cellulose Nanofiber (CNF) with Glacial Acetic Acid Via a Batch Process The nanocellulose substrate was derived from bleached eucalyptus sulphite dissolving pulp (DP~800), received in sheet form, that was first shredded and soaked in a swelling medium of 78% w/w aqueous morpholine. The swollen pulp suspension was then processed (×5 passes) through a M-110-EH Microfluidizer Processor (Idex Corp), fitted with a 200 micron ceramic auxiliary processing unit and 100 micron diamond interaction chamber (H-10Z). The nanocellulose was isolated as a dry powder by washing into water via multiple centrifugation/decantation steps and subsequent freeze drying Dry nanocellulose (4.0 g) was weighed into a 1 litre reaction flask along with 800 g glacial acetic acid and the mixture dispersed for 10 minutes at 10,000 rpm using an Ultraturrax mixer. The flask was fitted with a lid equipped with a condenser, thermometer, and heated on a hotplate with magnetic stirring. When the temperature reached 80° C., concentrated hydrochloric acid (1.8 ml) was added and stirring was continued at 80-85° C. for 2 hours, before being allowed to cool with stirring.

The dispersion was centrifuged to remove the acidic liquid phase and was redispersed with fresh water before a second centrifugation to remove most of the acid. The solid was again redispersed with fresh water at ~1% and stirred vigorously whilst the pH was adjusted to >6 with 1M sodium carbonate solution. The dispersion was then subjected to more centrifugation/wash cycles until the conductivity fell to <5 µScm$^{-1}$. The solid was then re-dispersed a final time in fresh water before being freeze-dried (VirTis SP Scientific Sentry 2.0).

The extent of surface acylation of the nanocellulose was determined by ATR-FTIR spectroscopy using a Perkin Elmer FTIR Frontier spectrophotometer fitted with a KRS-5 crystal. Spectra were recorded with 16 scans, with a resolution of 4 cm$^{-1}$, over the range 4000-450 cm$^{-1}$. The data were processed using PerkinElmer Spectrum software, plotting absorbance as ordinate. An apparent degree of substitution (DS) was estimated from the ratio of the heights of the ester carbonyl stretch peak at 1738 cm$^{-1}$ and the peak corresponding to the —C—O—C— deformation of the saccharide units at 1160 cm$^{-1}$. The measured peak ratio was converted into an apparent DS value by reference to a known calibration standard of commercial cellulose triacetate (reported DS=2.48). The peak ratio $A_{1738}/A_{1160}$=8.75 for the calibration standard. The apparent DS may therefore be estimated from the peak ratio for a given sample as follows:

$$DS=(A_{1738}/A_{1160})\times(2.45/8.75)$$

The apparent DS for this product was 0.4

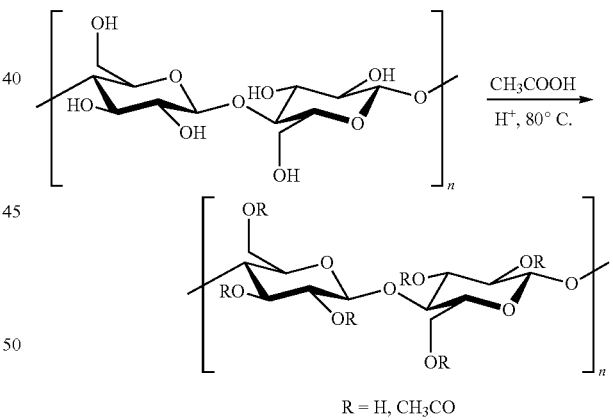

Example 12B

Simultaneous Surface Acetylation and Nanofibrillation of Cellulose Using Glacial Acetic Acid A cellulose suspension in water (200 g) previously prepared in a refiner (dry solids content~3.1%) was centrifuged and the water replaced stepwise with glacial acetic acid until a 0.5% dispersion was obtained in a solvent composed entirely of acetic acid. The dispersion was stirred manually before being introduced to a microfluidiser (model M110-P, Idex Corp) and processed three times through two interaction chambers with 400 µm and 200 µm channels connected in series, using a processing pressure of 25,000 psi. Concentrated hydrochloric acid (36%, 2 g) was then added to the mixture and it was processed another seven times through a second geometry consisting of a 200 µm auxiliary and 100 µm interaction chamber connected in series. The apparent D.S. was measured as for Example 1A and was 0.4

The invention claimed is:

1. A method for the production of chemically derivatized nanocellulose, comprising the step of:
   a. contacting a precursor cellulosic material with a chemically derivatizing composition to form a liquid reaction mixture,
   b. chemically reacting the formed liquid reaction mixture, and
   c. subjecting the formed liquid reaction mixture to microfluidisation,
   wherein the steps b. and c. are carried out simultaneously, and
   wherein the chemically derivatizing composition comprises an acylating agent.

2. The method according to claim 1, wherein the precursor cellulosic material is a suspension of precursor cellulosic material in a liquid phase.

3. The method according to claim 1, wherein the chemically derivatizing composition is a liquid chemically derivatizing composition.

4. The method according to claim 1, wherein the chemically derivatizing composition further comprises an acid or a base as a catalyst, and the chemically derivatized nanocellulose is acylated nanocellulose.

5. The method according to claim 4, wherein the acylating agent is an acylating agent that provides for a C1-C4 acyl moiety and the catalyst is an acid.

6. The method according to claim 4, wherein the acylating agent is an acylating agent that provides for a C1-C4 acyl moiety, where the acetylating agent is chosen from formic, acetic, butyric and propionic acid.

7. The method according to claim 1,
   wherein the chemically derivatizing composition consists of an alkenyl carboxylate and a base and the precursor cellulosic material is a suspension of precursor cellulosic material in acetone, and
   wherein the acetone is removed from the liquid reaction mixture prior to step b.

8. The method according to claim 7, wherein the alkenyl carboxylate is a vinyl carboxylate and wherein the base is a non-nucleophilic base.

9. The method according to claim 1, wherein the precursor cellulosic material is chemically unmodified nanocellulose.

10. The method according to claim 1, wherein the precursor cellulosic material is chemically unmodified nanocellulose in dry form.

11. The method for the production of chemically derivatized nanocellulose according to claim 1, comprising the steps of:
    a. contacting a precursor cellulosic material which is a chemically unmodified nanocellulose with a chemically derivatizing composition to form a liquid reaction mixture,
    b. chemically reacting the formed liquid reaction mixture, and
    c. subjecting the formed liquid reaction mixture to microfluidisation,
    wherein the steps b. and c. are carried out simultaneously, and
    wherein the chemically derivatizing composition is a liquid chemically derivatizing composition comprising a acylating agent suspended or dissolved in a non-aqueous liquid phase of an organic solvent.

12. The method for the production of chemically derivatized nanocellulose according to claim 1, wherein the acylation agent is an anhydride of a carboxylic acid.

13. The method according to claim 1, wherein the precursor cellulosic material is a suspension of precursor cellulosic material in a liquid phase, said liquid phase being a non-aqueous phase.

14. The method according to claim 1, wherein the chemically derivatizing composition is a liquid chemically derivatizing composition providing for essentially the entire liquid comprised in the liquid reaction mixture.

15. The method for the production of chemically derivatized nanocellulose according to claim 1, comprising the steps of:
    a. contacting a precursor cellulosic material which is a chemically unmodified nanocellulose with a chemically derivatizing composition to form a liquid reaction mixture,
    b. chemically reacting the formed liquid reaction mixture, and
    c. subjecting the formed liquid reaction mixture to microfluidisation,
    wherein the steps b. and c. are carried out simultaneously, and
    wherein the chemically derivatizing composition is a liquid chemically derivatizing composition comprising a acylating agent suspended or dissolved in a non-aqueous liquid phase of an organic solvent, and the liquid phase provides for essentially the entire liquid comprised in the liquid reaction mixture.

* * * * *